(No Model.)

T. W. HEERMANS.
ELEVATOR.

No. 497,520. 3 Sheets—Sheet 1.

Patented May 16, 1893.

Witnesses:
Inventor
T. W. Heermans
By Raymond & Verder
Attys (No Model.) 3 Sheets—Sheet 2.
T. W. HEERMANS.
ELEVATOR.
No. 497,520. Patented May 16, 1893.
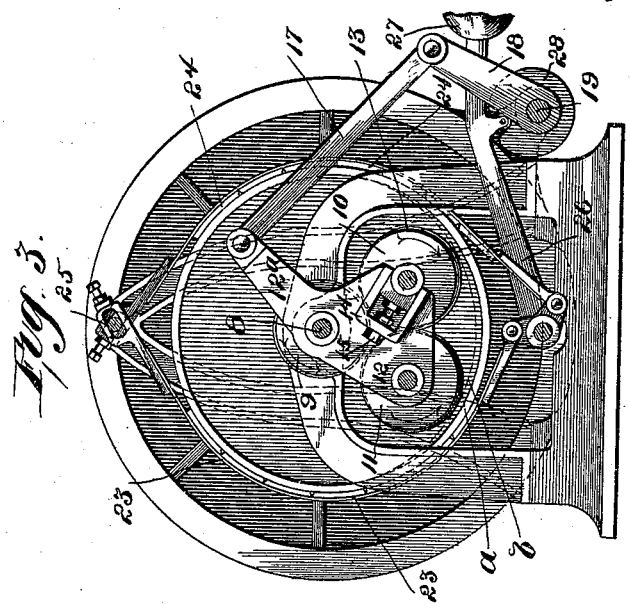
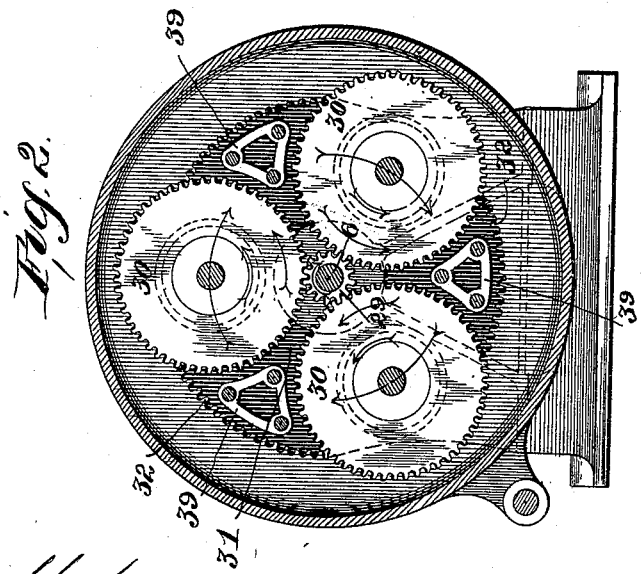

(No Model.)  
T. W. HEERMANS.  
ELEVATOR.

No. 497,520. Patented May 16, 1893.

3 Sheets—Sheet 3.

Witnesses  
Inventor:  
T. W. Heermans  
By Raymond & Keeder  
Atty's

UNITED STATES PATENT OFFICE.

THADDEUS W. HEERMANS, OF CHICAGO, ILLINOIS, ASSIGNOR TO THE CRANE ELEVATOR COMPANY, OF ILLINOIS.

ELEVATOR.

SPECIFICATION forming part of Letters Patent No. 497,520, dated May 16, 1893.

Application filed October 5, 1891. Serial No. 407,812. (No model.)

*To all whom it may concern:*

Be it known that I, THADDEUS W. HEERMANS, residing at Chicago, in the county of Cook and State of Illinois, have invented certain new and useful Improvements in Elevators, of which the following is a specification.

The principal object of my invention is to provide for the stopping, starting and reversing of the elevator without shock and independently of the motor, the latter running continuously and at a high speed, if, as is the case with electrical and some forms of steam and hydraulic motors, it is desirable.

Further objects of my invention are to make the machine compact and self-contained as well as safe and durable in operation.

Figure 1:
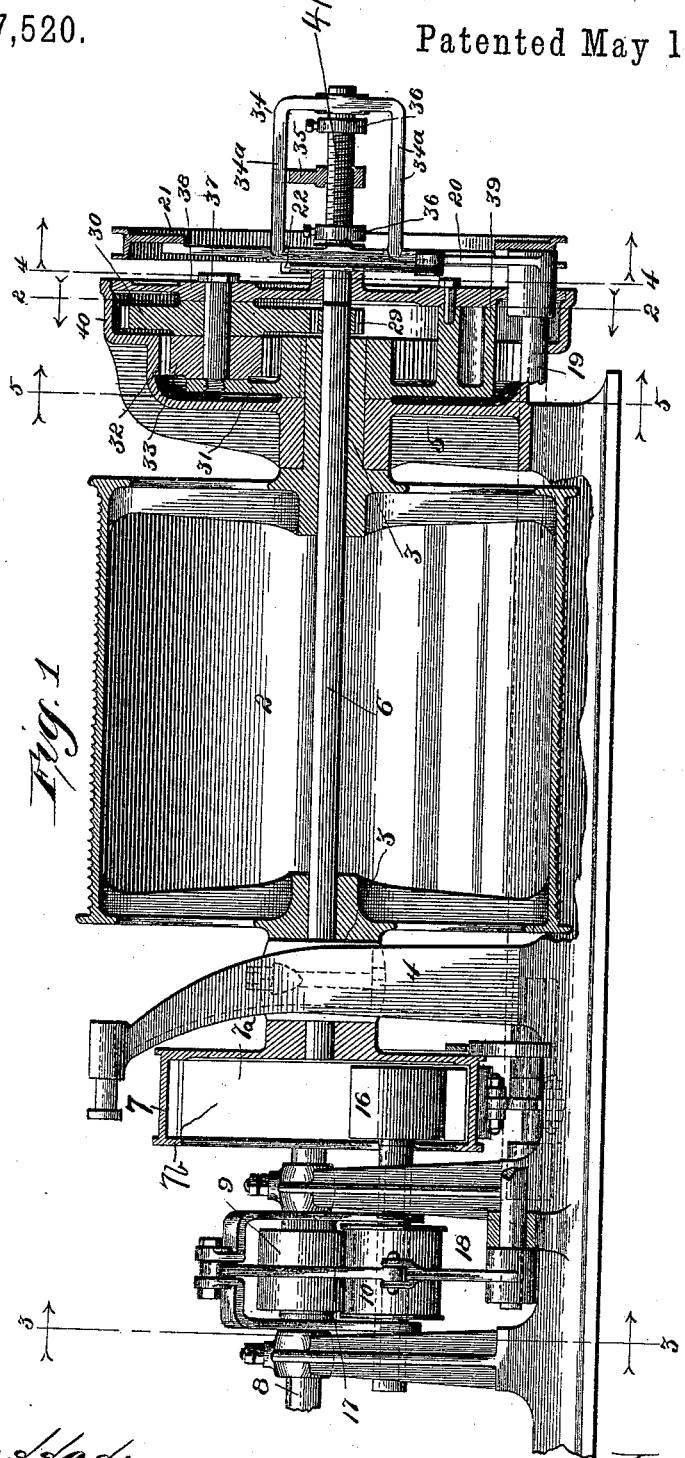
Figure 5:
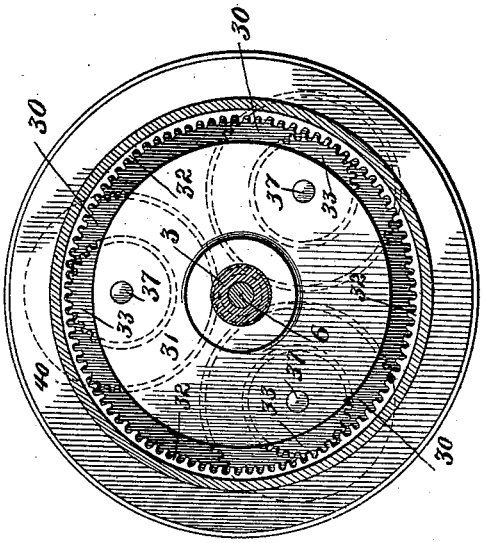
Figure 4:
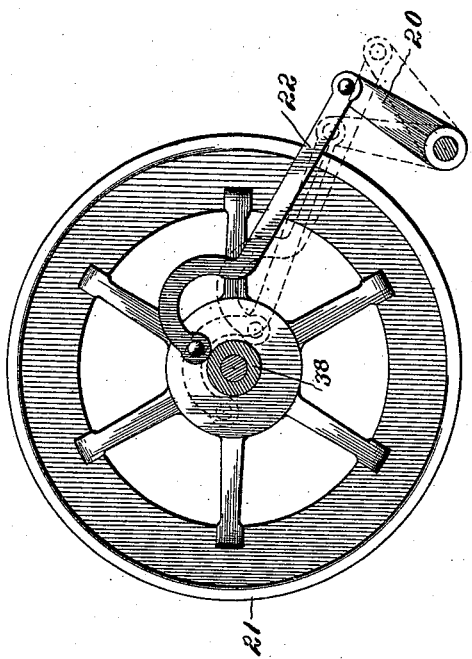

In the accompanying drawings: Figure 1 is a vertical longitudinal section of the apparatus. Fig. 2 is a section on line 2, 2, of Fig. 1, as seen by the direction of the arrow. Fig. 3 is a section on line 3, 3, of Fig. 1. Fig. 4 is a section on line 4, 4, of Fig. 1, and Fig. 5 is a section on line 5, 5 of Fig. 1.

2 is the drum on which the cable winds. It is supported by means of hollow trunnions 3, 3, whose bearings are in the standards 4, 5. Through the trunnions 3, 3 of the drum and concentric therewith passes a shaft 6, at one end of which is affixed an annular friction gear 7.

8 is a shaft connected to the motor which may be of any suitable kind, its axis being parallel to the axis of shaft 6 but slightly above the latter, so that it does not coincide therewith. The eccentricity of the two axes is indicated by the full lines and dotted lines *a* and *b* respectively (*vide* Fig. 3). Upon the motor shaft 8 is a friction gear or pulley 9 which drives the friction gears 10 and 11 mounted in the swinging-frame 12, the last named being hung on the shaft 8. The pulley 9 drives the pulley 10 directly by means of a loose leather or rubber ring 13 surrounding the pulley 10, the distance between the pulleys 9 and 10 being so regulated as to press the ring 13 between their faces. The pulley 10 drives the pulley 11 by the same means. For the purpose of adjusting and maintaining the pressure between the pulley 10 and opposed pulleys 9 and 11, the bearing which carries the pulley 10 is made adjustable in a slot in the frame 12 by means of a threaded stud 14 and nuts 15. Upon the projecting end of the shaft which carries the friction gear 10 is fixed a friction gear 16 (*vide* Fig. 1) within the annular gear 7. A corresponding gear is also mounted upon a projecting end of the shaft bearing the gear 11. Within the gear 7 is a loose ring 7$^a$ similar to the ring 13, its purpose and mode of operation being the same. The flange 7$^b$ projecting inward on the gear 7 keeps the ring 7$^a$ in place.

As indicated by the arrows in Fig. 3, gears 10 and 11 and the corresponding pair within the annular gear 7 revolve in opposite directions; so that as one or the other gear is brought in contact with the ring 7$^a$ in the annular gear 7, the latter will be driven forward or back. The swinging of the frame 12 carrying the gears to one side or the other of the central position in which it is shown in Fig. 3 will, owing to the eccentricity of the shaft 8 carrying the frame, and to the shaft 6 carrying the annular gear 7, result in bringing one or the other of the pair of gears projecting within the gear 7 into contact with the latter. This will be readily seen by comparison of the dotted arc *b* marking the path of the gears 10, 11 with the full line *a* defining the inner surface of the gear 7. The direction of revolution of the gears 10 and 11 is such as to tend to swing the frame 12 still farther and maintain the contact between the gear 7 and the gear 10 or 11 when such contact is once established. The movement of the swinging frame 12 to effect the starting, stopping or reversing of the annular gear 7 and its connected apparatus is effected by devices shown in Figs. 1, 3 and 4. To the arm 12$^a$ is pivoted a link 17 by which connection is made with an arm 18. The latter is secured to a shaft 19 running lengthwise of the apparatus and having at its opposite end a similar arm 20 connected to the shifting wheel 21. The last named wheel is operated by any convenient devices on the elevator car or cage. The connection between the shifting-wheel 21 and the arm 20 is a link 22 shown in side elevation in Fig. 4. The link 22 is pivoted to the wheel 21 at such a distance from its center that a full half revolution of the wheel is necessary in order to give the requisite movement to the shifting devices. The wheel 21 is capable of movement through a little more than a semi-circle, the central and two extreme positions of the connecting link 22 and its attachments being shown in the full and dotted lines respectively of Fig. 4. The line of centers of the wheel and the pivotal points of the link 22 are so arranged that there is no tendency when the wheel is fully shifted for it to return from either of its extreme positions.

As seen in Fig. 3 the brake is so connected with the shifting apparatus as to be automatically applied when the latter is in its middle position so that the driving gears are disengaged. The brake consists of straps 23, 24 adjustably supported on the stud 25 and attached at their ends to the arms of a lever 26 which has a weight 27 at its farther extremity. A notched disk 28 upon a shaft 19 operates the lever 26, the notch being so located as to permit the lever to drop when the shifting apparatus is in its middle position, the brake being thereby applied; while the movement of the shifting device in either direction serves to raise the lever out of the notch and release the brake.

The gearing connecting the shaft 6 to the winding drum is seen in Figs. 1, 2 and 5. A pinion 29 is fixed upon the end of the shaft 6 which projects beyond the trunnion 3 of the hoisting-drum. Said pinion meshes into one or more gears 30 (in the drawings three are shown) whose axes are secured to a disk or spider 31 fastened to the projecting end of the trunnion 3. The standard 5 carries an internal gear 32 (vide Figs. 1 and 2) into which mesh gears 33 fastened to, or forming an integral whole with, the gears 30. The effect of the gearing just described is to drive the drum in the same direction as the shaft 6 and its attached pinion 29 but at a reduced rate of speed, the reduction of speed being greater from the use of the additional gears 33 which are smaller in diameter than the gears 30. Of course the movement will be essentially the same if the gears 30 meshed into an internal gear, but the speed of the drum would be less reduced. To shield the gearing and to provide an additional support to the pins 37 upon which the gears 30 and 33 revolve, a disk 38 is bolted to projections 39 (vide Figs. 1 and 2) from the disk 31. Said disk 38 projects sufficiently to meet the overhanging housing 40 extending from the internal gear 32. The handling wheel 21 is journaled on an overhanging shaft 41 fastened in the center of disk 38 which moves at the same speed as the drum. Said wheel 21 is provided with a U-shaped frame 34, likewise supported at its outer end upon the shaft 41. The sides 34ª of the U-shaped frame are parallel with the shaft 41 and the portion of the latter included within the frame is threaded and provided with a nut 35. The latter has a projecting arm slotted to receive a side 34ª of the U-frame.

Adjustable stops 36 are provided at or near each end of the threaded portion of the shaft 6, so that when the nut 35 comes in contact with either stop it is compelled to revolve with the shaft and thereby move the hand-wheel 21. The stops 36 are so adjusted as to make contact with the nut 35 whenever the car or cage has reached the limit of its travel at the top and bottom. The shifting of the hand-wheel results in bringing the driving gear to its middle position and stopping the car so that the latter will not overrun.

I claim—

1. The combination with the hoisting drum, of a reversible driving mechanism comprising a friction gear connected with the hoisting drum, a friction driving gear, 9, two intermediate driving gears driven in opposite direction by the driving gear 9, and an oscillating frame in which the last said gears are mounted, the center of oscillation of the frame coinciding with the axis of rotation of the driving gear, substantially as set forth.

2. The combination, in a reversible hoisting apparatus, of a friction gear connected to the motor; a pair of friction gears driven therefrom but in opposite directions; a second pair of friction gears upon the shafts carrying the first named pair; a swinging frame carrying said gear shafts; and a friction gear connected positively with the hoisting drum and with which the gears of the second pair may alternately make contact, substantially as described.

3. The combination of a friction gear connected with the hoisting drum, and whose axis is parallel to, but not coincident with, the axis of the motor shaft, a swinging frame, whose pivotal axis is coincident with the axis of the motor shaft and which carries a pair of friction gears driven in opposite directions by said motor shaft and adapted to make operative connection with said first named friction gear by the shifting of said swinging frame, substantially as described.

4. The combination of an annular friction gear connected with the hoisting drum whose axis is but slightly eccentric with, the axis of the motor-shaft; a swinging frame whose axis of vibration is coincident with the axis of the motor shaft and which carries a pair of friction gears projecting within the annular gear, said gears being driven in opposite directions by the motor shaft, and being adapted to make operative connection alternately with said annular gear when the frame is swung in one direction or the other, substantially as described.

5. The combination of an annular friction gear connected with the hoisting drum and whose axis is parallel to, but slightly eccentric with, the axis of the motor-shaft, a swinging frame whose axis of vibration is coincident with the axis of the motor-shaft and which carries a pair of friction gears projecting within the annular gear, said gears being driven in opposite directions by the motor shaft, and being adapted to make operative connection alternately with said annular gear when the frame is swung in one direction or the other, the direction of revolution of said gears being such as to tend to bring them in to closer contact with the annular gear, substantially as described.

6. The combination with a hoisting drum of a reversible driving mechanism consisting of a pair of friction gears connected to the motor; a swinging frame whose axis of vibration is coincident with said friction gears; a pair of friction gears carried by said frame; a loose ring of flexible material surrounding one of said pairs of friction gears and making operative connection of the said gear to the first named gear and to the second of said pairs of gears; a second pair of gears on the shafts of the first named pair, a friction gear connected positively with the hoisting drum; and a loose ring interposed between the last named gear and the second pair of gears carried by the swinging frame, substantially as described.

7. The combination of an annular friction gear connected with the hoisting drum and whose axis is parallel to, but slightly eccentric with, the axis of the motor-shaft; a loose ring of leather or other flexible material within said annular gear; a swinging frame whose axis of vibration is coincident with the axis of the motor-shaft and which carries a pair of friction gears projecting within the annular gear, said gears being driven in opposite directions by the motor-shaft, and being adapted to make operative connection alternately with said annular gear when the frame is swung in one direction or the other, substantially as described.

8. The combination, of a drum mounted on hollow trunnions; a shaft passing through said trunnions concentric with the drum and connected at one end by gearing with the drum and at the other end with a reversible driving gearing said driving gearing consisting of a friction gear connected to the drum, and oppositely revolving friction gears mounted in a swinging frame whose axis is parallel to but slightly eccentric with the axis of the first named gear; a shifting wheel connected to said swinging frame through a rock-shaft extending parallel to the first named shaft; an overhanging shaft, 41, carrying said shifting wheel, substantially as described.

9. The combination, of a drum mounted on hollow trunnions; a shaft passing through said trunnions concentric with the drum and connected at one end by gearing with the drum and at the other end with a reversible driving gearing said driving gearing consisting of a friction gear connected to the drum, and oppositely revolving friction gears mounted in a swinging frame whose axis is parallel to but slightly eccentric with the axis of the first named gear; a shifting wheel connected to said swinging frame through a rock-shaft extending parallel to the first named shaft; an overhanging shaft, 41, having its outer end threaded, and carrying the said shifting wheel; a nut on the threaded portion of said shaft, capable of longitudinal movement, but not of revolution independent of said shifting wheel; and stops limiting the movement of said nut, substantially as described.

THADDEUS W. HEERMANS.

Witnesses:
IRWIN VEEDER,
TODD MASON.